April 18, 1967 J. LAKE ETAL 3,314,513
SELF-CONTAINED WET CLUTCH SYSTEM
Filed July 19, 1965 4 Sheets-Sheet 1

Inventors
James Lake and
Romas B. Spokas
By Joseph W. Malleck
Att'y.

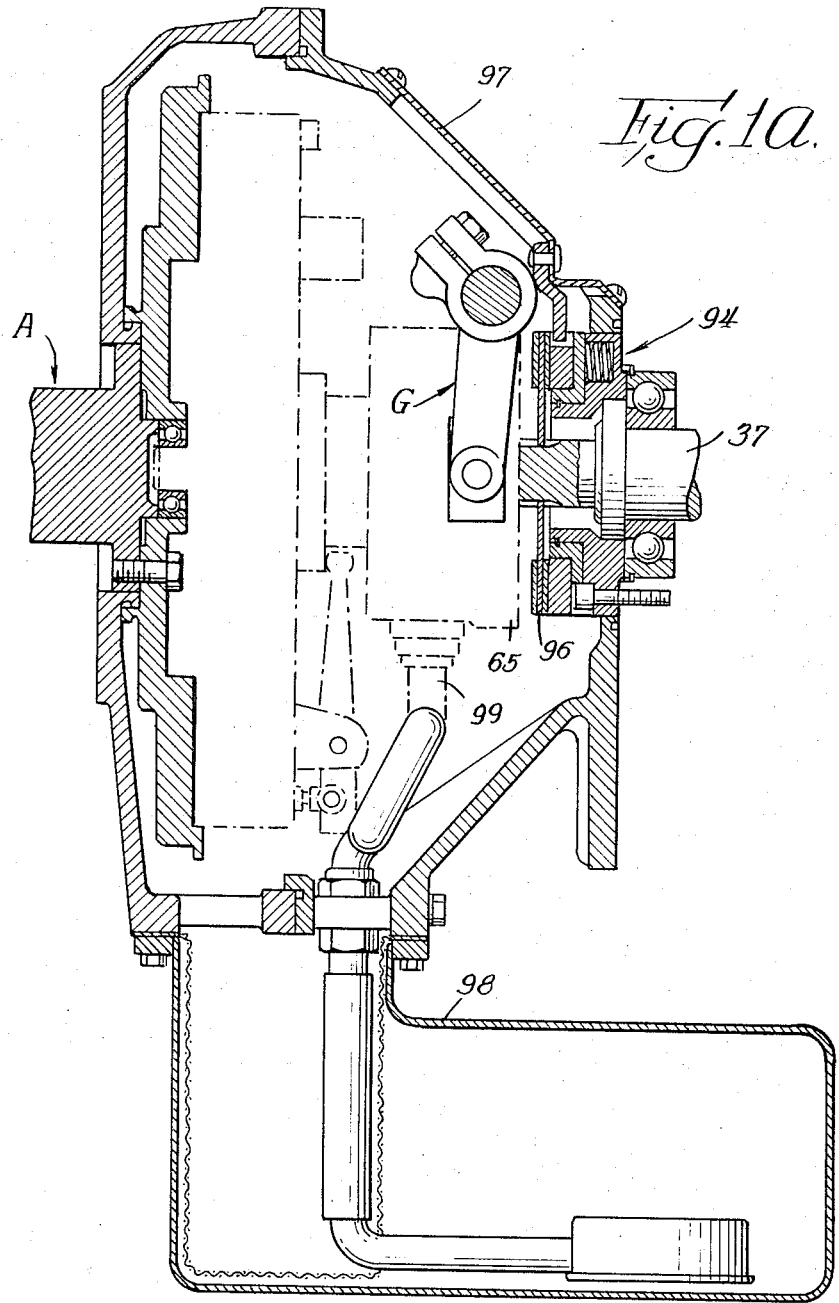

Inventors
James Lake and
Romas B. Spokas
By
Atty.

April 18, 1967  J. LAKE ETAL  3,314,513
SELF-CONTAINED WET CLUTCH SYSTEM
Filed July 19, 1965  4 Sheets-Sheet 4

Inventors
James Lake and
Romas B. Spokas
By
Att'y.

United States Patent Office 3,314,513
Patented Apr. 18, 1967

3,314,513
SELF-CONTAINED WET CLUTCH SYSTEM
James Lake, and Romas B. Spokas, Rockford, Ill., assignors to Borg-Warner Corporation, Chicago, Ill., a corporation of Illinois
Filed July 19, 1965, Ser. No. 473,029
10 Claims. (Cl. 192—91)

This invention related to friction devices and more particularly to a self-contained wet clutch system where the friction elements are continuously bathed by a supply of fluid.

Wet clutches of the type installed in current vehicles, are quite costly, elaborate, and difficult to engineer. One difficulty arises in furnishing the supporting equipment to serve the wet clutch. Since all light-duty, slow moving wet clutches require circulated oil or other fluids, a pump is required in the system. A power take-off mechanism of some type is, therefore, required to drive the hydraulic pump. Design limitations usually dictate that the pump and pump drive be located some distance from the clutch which then creates a plumbing problem in getting the oil or other fluids to and from the clutch.

Another problem in the design of a satisfactory wet clutch system is that of maintaining sufficiently low release efforts on the part of the operator since the coefficient of friction between friction elements of a wet clutch is much lower than in a dry clutch. This requires that the clutch be either larger in diameter (have more friction elements or plates) or have a higher applied clamping load to deliver an equivalent torque. Some systems utilize some type of power assist device attached to the external linkage; with the assist device mounted externally of the clutch sealing becomes critical and leakage is a problem.

Still another consideration in the design of wet clutch system is that of a transmission brake. A transmission brake usually becomes necessary as viscous drag is present resulting from oil flowing between the clutch plates when the clutch is in the released position. In present spring-loaded wet clutch systems, this transmission brake is usually located externally of the clutch device and is operated by the clutch release linkage. This requires that the clutch release and the brake engagement be maintained in fine adjustment at all times to prevent a fight between the clutch and transmission brake.

The present invention has been conceived to overcome the above limitations and problems of typical prior art wet clutch systems by the provisions of a self-contained system which can be easily attached to the engine flywheel of a vehicle; the components comprising a clutch, an oil circulating pump, transmission brake, and in some cases a hydraulic assist have been arranged in a single compact package.

Therefore, the primary object of this invention is to provide an improved wet clutch or other friction device which is characterized by greater economy, more rugged construction, and which is less subject to leakage problems.

Another object is to provide a self-contained wet clutch system having an integrated fluid source compactly arranged between a reciprocable actuating sleeve and a drive sleeve, the fluid source having a fluid pump housing which is rotationally and axially stationary. A particular structural feature of this object is the manner of connection of the fluid pumping means to each of the sleeves whereby rotative drive may be received from one while rotative reaction is received from the other and with provision for non-axial movement in spite of reciprocation of one of the sleeves.

Yet another object of this invention is to provide a wet type friction device which is self-contained but which is relatively free from dynamic fluid unbalance. A specific teaching pursuant to this is the provision of input and output clutch means which define a compact fluid enclosure for containing the fluid effective to bathe the friction elements, and the provision of balanced fluid chambers within a reciprocal fluid unit which may be used for powered assist in disengaging the clutch.

Yet still another object of this invention is the provision of an integrated wet clutch system which has been improved to substantially eliminate foaming action of the fluid bath tending to decrease effectiveness of friction plate cooling.

Another object is the incorporation of a hydraulic servo-assist which is served by the self-contained fluid source of the previous objects and which is compactly arranged within the reciprocal sleeve. Structural features of the servo-assist comprise provision of a bi-partite reciprocal sleeve, the parts thereof being normally spring biased together but subject to limited axial separation upon overcoming of the spring bias to regulate diversion of the fluid output from the pumping means, which is normally directed to bathe friction elements, to actuate said servo-assist. Means for varying the spring bias force to regulate the degree of assist may be incorporated.

Another object is the provision of thrust bearing means, interposed between the rotative input and output of the system which is urged to maintain full bearing contact by impingement of fluid from said fluid source.

Other objects and advantages of this invention will become more apparent from the following detailed description taken in connection with the accompanying drawings in which:

FIGURE 1a is an overall assembly illustration for the clutch of FIGURE 1;

Figure 1:
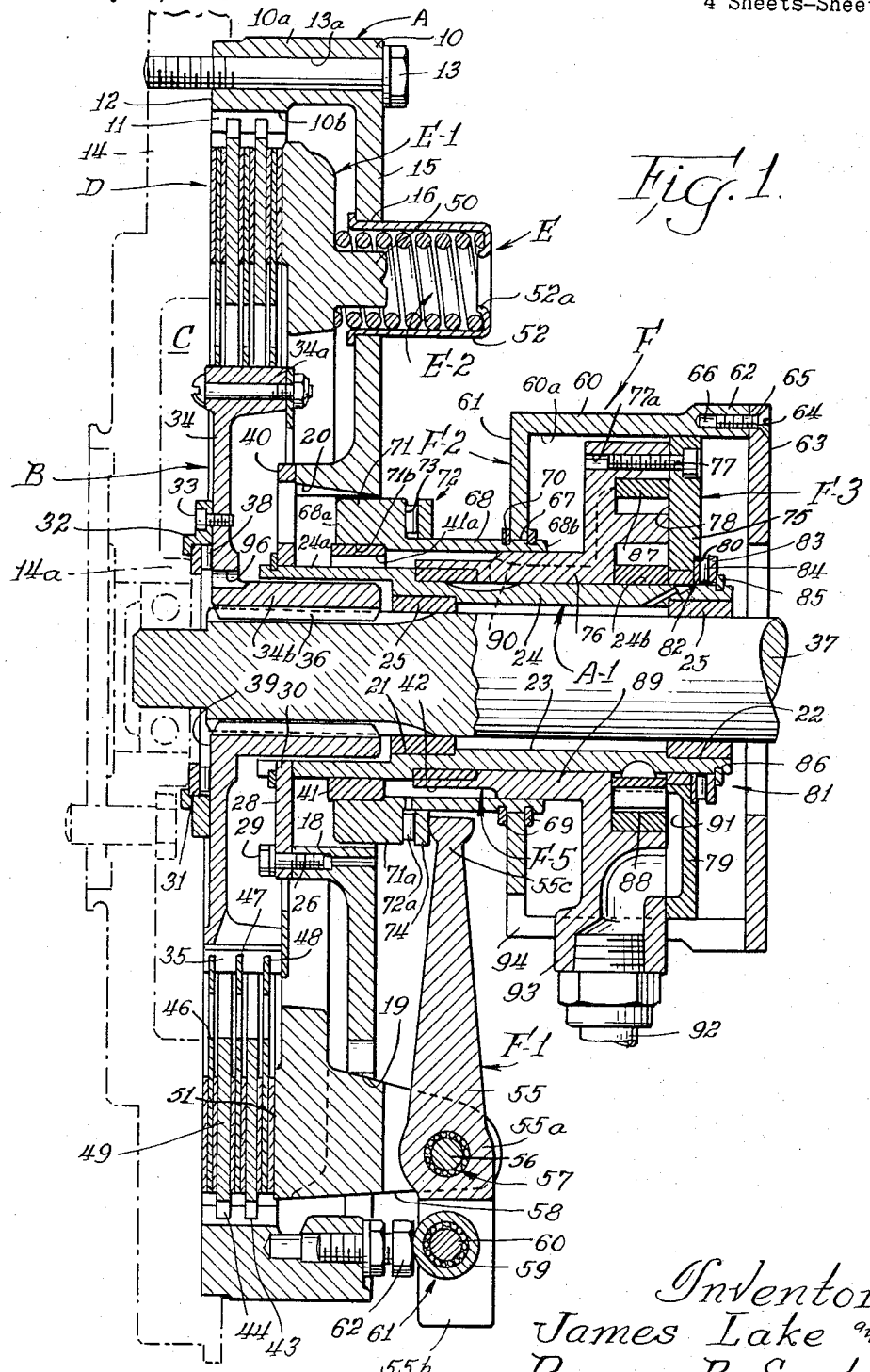
FIGURE 1 is a central elevational cross-section of a self-contained wet clutch adapted to be attached to a flywheel of a vehicle engine and which embodies the principles of this invention.
Figure 2:
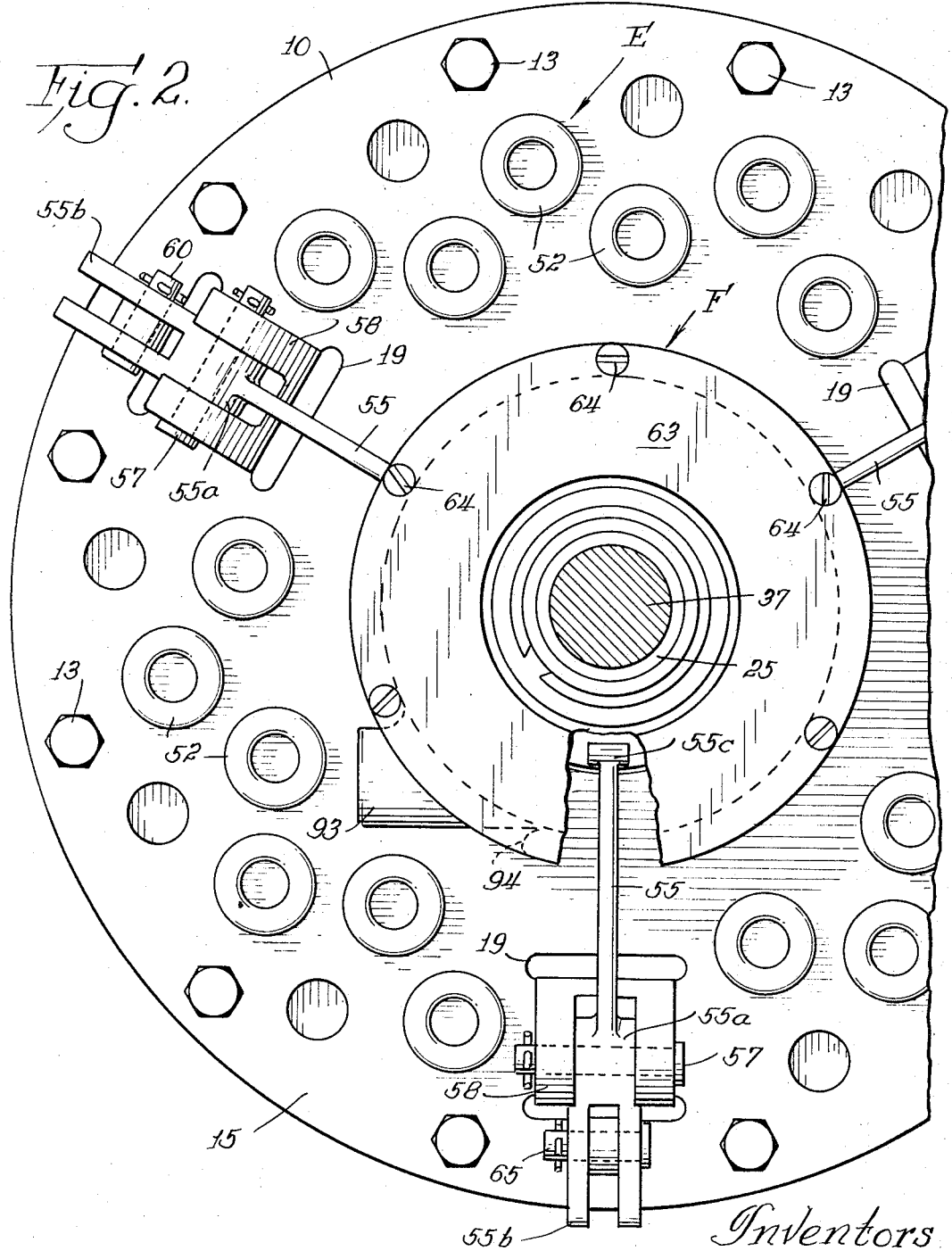
FIGURE 2 is a side elevational view of the structure illustrated in FIGURE 1, having certain portions thereof broken away.

Turning now to the drawings and particularly to FIGURES 1 and 2, there is illustrated a preferred embodiment of this invention which broadly comprises a rotative input means A employing a drive sleeve A–1 extending rearwardly therefrom and which is restrained from axial movement while being rotatively driven; a rotative output means B cooperating with the input means to define a fluid enclosure C within which is disposed a plurality of friction element D associated with each of the input and output means to form a pack. Means E is employed to provide a normal resilient engaging force and includes a rotatively driven pressure plate E–1 and a plurality of coil springs E–2 acting between the input means A and the pressure plate to provide clutch engagement. The self-contained system has an operating assembly F employing a plurality of radially disposed levers F–1 which are connected to the pressure plate and adapted to provide a pulling action to disengage the clutch; a reciprocal unit F–2 is mounted for movement relative to the drive sleeve A–1 and is adapted to engage the levers F–1 for providing the pulling action for disengagement. A fluid pumping means F–3 is interposed between the drive sleeve A–1 and the unit F–2; fluid directing means F–5 is employed for continuously conveying the fluid output of the pumping means to the chamber C for bathing the friction elements and for selectively conveying fluid to a hydraulic servo means F–4 utilized in the alternative embodiment of FIGURE 3. A manually operated means G is employed to initiate the disengaging operation of the assembly F.

Turning now to the components in particular, the rotary input means A comprises an annular drive ring 10 having a cylindrical body with an outer cylindrical surface 10a which defined the maximum diameter of the clutch device; the ring 10 has an interior cylindrical surface 10b on which is defined a plurality of axially extending splines 11. The ring has a front flat face 12 adapted to be mated with a flywheel 14 which is typically an element of the engine unit of a vehicle, although cooperating with the clutch device. The ring is attached to the flywheel by fasteners 13 extending through axially directed openings 13a which are circumferentially spaced thereabout. A substantially flat backing plate 15 is separately attached to the ring 10 or may be integrally formed therewith to extend radially inwardly thereof. Plate 15 has a first ring of circumferentially spaced openings 16 adapted to receive the engaging springs E–2 as will be described and a second series of circumferentially spaced openings 19 for permitting bosses of the pressure plate E–1 to extend therethrough. A central opening 18 is defined in the backing plate through which extends the output means B. Adjacent the central opening 18 is formed integral means having a forward etxending annular flange or boss showing biased grooves 20 formed at spaced locations along the interior surface 19a thereof. Sleeve A–1, which forms a part of the input means, has an elongated cylindrical body 24 provided with outer stepped portions 24a and 24b; portion 24a extends through the central opening 18 of the backing plate in spaced relationship so as to pilot a portion of the operating assembly therebetween. Portion 24b has annular recesses 21 and 22 defined in the interior surface 23 thereof to receive bushings 25 for journalling the sleeve A–1 on the shaft 37 forming part of means B. An annular drive element 28 inter-connects the flange 19 of the backing plate and the portion 24a of the sleeve A–1. Annular member 28 has an outer periphery fastened to flange 19 by a plurality of cap screws 29 extending into threaded openings 26 of flange 19; the interior periphery 30 of member 28 is keyed or splined to the forward stepped portion 24a of the drive sleeve for rotation therewith. The rotary output means B comprises a hub 34 having an outer flange 34a provided with a plurality of splines 35 and a radially inner portion 34b having internal splines 36 for providing a rotative driving connection with the driven shaft 37 received therein and extending through the drive sleeve A–1, axially spaced bushings 25 provide the pilot or journal for the rear portion 24b of drive sleeve A–1 on shaft 37. The inner portion 34b pilots the forward portion 24a of the drive sleeve.

The fluid chamber C is defined by mating flywheel 14 with the drive ring 10, the inner portion of the chamber being closed by nesting of the hub 14a of the flywheel with the driven hub 34, which in turn journals the drive sleeve forming part of the backing plate. A thrust bearing assembly is interposed between hub 14a and hub 34 and specifically comprises a first annular race 31 shouldered against hub 14a and an annular retainer 32 attached to hub 34 by spaced fasteners 33 effective to maintain assembly of a plurality of radially disposed needle bearings 38 forming a ring, the bearings 38 contacting race 31 and surface 39 of hub 34, the latter forming the other race of the bearing means.

Fluid communication into chamber C is gained through circumferentially spaced openings 40 formed in the member 28 and are normally in communication with grooves 41a formed in an annular bushing 41 piloting unit F on portion 24a. Grooves 41a communicate with an annular recess 42 defined in the outer surface of a portion of the pump means which directly receives the fluid output of the pumping means F–3.

The friction elements D may be comprised of a plurality of friction discs 46 each having a central opening 47 provided with splines 48 effective to mate with the complementary splines 35 on the hub flange 34a and a plurality of inter-leaved friction plates 49 rotatively held by the drive ring 10 by way of splines 44 formed on the outer periphery 43 of plates 49 and received in complementary splines 11 of the drive ring.

The clutch engaging means E particularly comprises the annular pressure plate E–1 provided with a plurality of rearwardly extending bosses 50; the pressure plate has a front face 51 adapted to frictionally engage the pack of friction elements D. The pressure plate is normally urged to promote clutch engagement by the plurality of coil springs E–2, each spring having one end journalled about a boss 50 of the pressure plate and an opposite end journalled within a flared portion 52a of the spring cups 52, the latter being received in the openings 16 of the backing plate.

The operating assembly F of the preferred embodiment has a lever system F–1 of the pull-type wherein each lever 55 has an intermediate portion 55a journalled or pivoted about an axis 56 provided by a needle bearing assembly 57 carried by arms 58 protruding through the opening 17 in the backing plate; the arms are integrally formed on the pressure plate E–1. The outer portion 55b of each lever has an antifriction contact provided by a rollable member 59 journalled on an axis 60 of the outer end by a needle bearing assembly 61, said roller assembly being effective to contact suitable stops 62 extending rearwardly from the outer periphery of the backing plate of the drive means. The inner end 55c of each lever is accordingly adapted to be moved in a rightward direction (as viewed in FIGURE 1) so as to pull the intermediate portion 55a and thereby the pressure plate with it for disengagement of the clutch. Movement of the end 55c must be accomplished by a force sufficient enough to overcome the engaging means E which also act on the pressure plate body in an opposite axial direction.

The reciprocal unit F–2 is provided for pulling the inner portion 55c of the levers in a retracting direction (to the right as viewed in FIGURE 1). The unit F–2 is bipartite and is composed of a first element 60 having a cylindrical configuration closed at one end 61 and an open end 62 carrying a brake plate 63 by suitable fasteners 64 extending through openings 65 along the periphery of the brake plate and into threaded openings 66 in the end 62 of element 60. The brake plate is adapted to engage a brake disc 97 carried by the driven shaft 37 and clamp against a reaction assembly 96 carried by the clutch housing 98. The interior cylindrical surface 60a is piloted upon the exterior of the pumping means F–3 for reciprocal movement. The closed end 61 of the cylinder has a central opening 67 within which is received the second element 68 forming a neck portion for the unit. Elements 60 and 68 are joined together for reciprocation by snap rings 69 received in suitable grooves 70 in end 68b adjacent opposite sides of the end portion 61 of the cylinder. The end 68a of element 68 has a radially outwardly extending annular shoulder 71, the outer periphery 71a of which is in sliding engagement with the interior 18 of the boss of the backing plate. The interior 71b of the shoulder 71 is piloted upon the bushing 41 which in turn is journalled about the drive sleeve A–1. The aft portion 68b of element 68 is piloted upon the exterior of a reduced portion of the pumping means F–3. In all, the reciprocal unit F–2 has three annular locations at which it is piloted, two of which are upon stepped portions of the pumping means F–3 and one portion which is upon a bushing 41 supported by the drive sleeve.

A thrust bearing assembly 72 is provided between the ends 55c of the levers 55 and the rearwardly facing surface 73 of shoulder 71 of element 68. The assembly comprises a plurality of needle thrust bearings 72a, which are radially directed and function against surface 73 as one race and against an annular ring 74 forming the other race and which has an opposite side in contact with the levers.

The pumping means F–3 comprises a pair of housing portions 75 and 76 which are joined together at their outer peripheries by suitable fasteners 77 extending through respectively aligned openings 77a in each thereof. Housing portion 75 has a generally flat interior face 78 lying in a radial plane and an exterior side 79 provided with an annular recess 80 at its radially innermost portion, recess 80 being effective to receive a thrust bearing assembly 81 comprised of annular races 82 and 83 disposed on opposite sides of needle bearing 84; the thrust bearing assembly 81 is maintained in assembly by bearing against the recess and against a snap ring 85 received in a groove 86 of the drive sleeve A–1. The other housing portion 76 has an interior cavity 87 for receiving a pair of pumping gears 88 and a suitable crescent element which together constitute the interior pumping elements. The housing portion 76 has an annular neck 89 piloted upon the exterior drive sleeve A–1 and a passage 90 serving as an outlet for the fluid output from the pumping elements; passage 90 communicates with the grooves 42 defined in the outer portion of the neck 89. The passage 91 is defined in the other housing portion 75 to serve as the fluid inlet to the pumping elements and is provided with a flexible connection 92 threadably received in a terminal 93 for communicating with passage 91 and thereby with a fluid sump 99 which is disposed at the bottom of a clutch housing 98 which surrounds the device herein (see FIGURE 1a). Terminal 93 extends through an elongated opening 94 defined in the cylinder 60, the sides of which restrained the pump housing portions from rotative movement while yet permitting axial movement therein.

Whenever the engine which supplied power to the clutch is running, the drive sleeve A–1 is continuously rotated by being drivingly connected to the clutch input comprised of the backing plate 15, ring 10, and inter-connected by way of an annular splined member 28 carried by the backing plate. The fluid output of pumping means F–3, resulting from such continuous operation, is delivered through the passage 90 which is in communication with one or more grooves 42 defined in the exterior of the housing portion neck 89 and passes between the elements 68 in the drive sleeve A–1 to thence pass through grooves 41a in the bushing 41 for entering a space adjacent the annular member 28; from there fluid may pass through openings 40 in member 28 closely adjacent the inner portion of the hub 34 within the chamber C. Fluid directed to the inner portion of the hub is also able to pass through openings 96 in the hub for seeking the opposite side thereof. The force of fluid impingement against the righthand side of hub 34 is effective to urge said hub against the needle bearing assembly which spaces the hub 34 and the hub 14a apart. Thus, proper radial alignment and full contact of the needle bearings will be assured.

To release the clutch and overcome the clutch engaging springs E–2 which normally urge the friction elements, including the pressure plate E–1, into stacked inter-engagement (as shown in FIGURE 1), the unit F–2 is moved by manual means G (such as linkage connecting with a clutch pedal operated by the vehicle uses) to the right, sliding along the several annular and radially spaced journals of the reciprocal unit. This urges the thrust bearing assembly 72 to the right to urge the inner end of the levers 55c to pivot and thereby force the intermediate portion 55a in a rearward direction to disengage the stacked friction elements. This disengaging operation in no way interrupts the fluid directing means F–5 which continuously supplies fluid from the pumping means F–3 to the chamber C.

Figure 3:
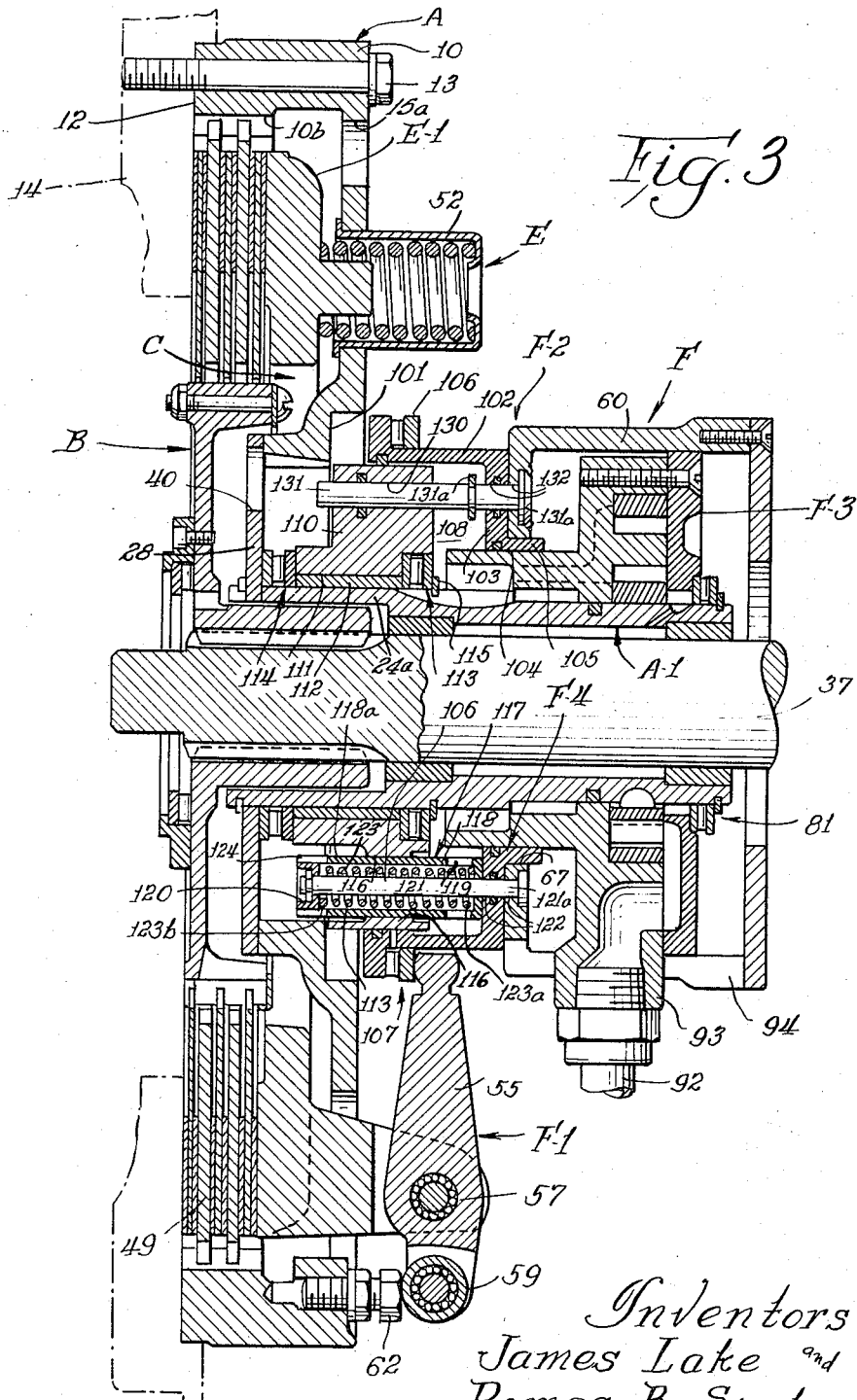
FIGURE 3 is an illustration of an alternative embodiment of this invention.

In FIGURE 3 is shown an alternative embodiment which particularly employs a servo means F–4 as part of the unit F–2. Identical parts to those of the preferred embodiment will have similar reference numerals herein.

The backing plate 15 is modified to have an annular recess 101 defined in the radially inner portion thereof (facing to the right as viewed in FIGURE 3) to accommodate the nesting reciprocal movement of the second element of unit F–2; the second element 102 herein has a drum-like configuration, complementary to the first element but reversed in position. The element 102 has a closed end 103 provided with a central opening 104 effective to slide upon the neck of the pump housing portion 76. An annular flange 105 is arranged about the opening and extends rearwardly to journal the interior periphery of opening 67 of the element 60. At the other end of element 102 is provided a shoulder 106 for receiving the axial thrust from a thrust bearing assembly 107 which in turn engages the inner end of the levers 55.

To define a pressure chamber 108 in cooperation with the element 102, the reaction member 110 is provided in a form of a ring which has a central opening 111 received upon a bushing 112 which in turn is journalled upon the forward stepped portion 24a of the drive sleeve A–1. The ring 110 is maintained in axial fixed position between thrust bearing assemblies 113 and 114, assembly 114 receiving its axial reaction from the member 28 and drive sleeve A–1, and the other assembly 113 from a snap ring 115. The ring 110 has a first plurality of openings 116 within each of which is received a spring assembly 117 for biasing the elements 102 and 60 together. Other openings 130, in ring 110, receive pins 131 which extend through aligned openings 132 in elements 102 and 60, the pins serving as an axial guide and limit by way of flanges 131a.

Each spring assembly 117 comprises a tube 118 having openings 119 at one end thereof effective to communicate with the pressure chamber and thereby through its interior with openings 40 in the member 28. A slideable element 120 is carried upon a rod 121 within the interior of the tube 118, the rod 121 extending through aligned openings 122 in the closed portions of each of the elements 102 and 60. One end 121a of the rod carries a head for limiting movement of the rod to the left and the other end 121b of the rod carries the slideable element 120 which is in fluid sealing relationship with the interior of the tube 118. A coiled compression spring 123 is disposed about each of the rods 121 and has one end 123a bearing against the closed end of element 102 and another end 123b bearing against element 120. Grooves 124 are provided in the end 118a of the tube which are normally open as permitted by the slideable element 120 when fully biased to the extreme left position (as shown in FIGURE 3) and thereby permit the fluid output of the pumping elements to pass openings 40 and into chamber C for bathing the friction elements. Upon movement of the element 60 during initial disengagement promoted by manual means G, the springs 123 will be compressed, since element 102 will be urged to maintain an axial stationary position by the reaction of the engaging spring E–2. During such movement slideable element 120 will move with element 60 via rod 121 and gradually and progressively close the grooves 124 in the end 118a of the tube and thereby restrict the fluid flow therethrough causing pressure to build up within the chamber 108 and thereby hydraulically urge element 102 to the right to re-engage element 60 and provide a hydraulic assist force. The operation of other aspects of the embodiment of FIGURE 3 is similar to that of FIGURE 1, except that fluid introduced to the radially inner portion of chamber C may pass between the friction discs and exit from the chamber C through opening 15a which direct the exiting fluid axially and prevents foaming.

While we have described our invention in connection with one specific embodiment and other alternative suggestions thereof, it is understood that this is by way of illustration and not by way of limitation and the scope of our invention is defined solely by the appended claims which should be construed as broadly as the prior art will permit.

What is claimed is:

1. A self-contained wet clutch system, comprising: rotatable input means and rotatable output means cooperating to define a fluid enclosure, said output means having a driven shaft extending out of said enclosure; friction elements disposed in said enclosure and effective to be normally inter-engaged for drivingly connecting said input and output means and effective to be selectively dis-engaged for interrupting said connection; a drive sleeve mounted about said driven shaft adjacent said enclosure and effective to rotate with said input means while being fixed against axial movement relative to said driven shaft; an operating assembly having a cylinder concentrically journalled about said drive sleeve effective to be axially reciprocated thereon and having one portion operably connected with said friction elements for providing dis-engagement when moved in one axial direction on said drive sleeve, said cylinder being fixed against rotation; fluid pumping means interposed between said cylinder and drive sleeve with rotative reaction received from said cylinder; and fluid directing means effective to continuously direct the fluid output of said pumping means to said enclosure for bathing said friction elements during all phases of operation.

2. A self-contained wet clutch system as in claim 1, in which said rotative input means comprises a flywheel defining the forward portion of said enclosure, a drive ring coupled to the outer periphery of said flywheel and carrying a backing plate extending radially inwardly thereof terminating in a radially inner central flange, means drivingly connecting said flange of said backing plate with said drive sleeve and said fluid directing means being effective to introduce fluid at the radially innermost portion of said enclosure, directing the fluid to traverse said friction elements and exit from said enclosure in an axial direction to prevent foaming.

3. A self-contained wet clutch system as in claim 2, in which means providing normal engagement of said friction elements comprises a plurality of coiled compression springs connected to operate between said backing plate and said friction elements.

4. A self-contained wet clutch system as in claim 1, in which said operating assembly cylinder specifically comprises a hollow drum portion effective to surround said fluid pumping means and a neck portion effective to telescope into and out of said input means while reciprocated.

5. A self-contained wet clutch system as in claim 1, in which said operating assembly carries a braking plate effectively to be operably engaged in synchronization with the dis-engagement of said friction elements.

6. A self-contained wet clutch system as in claim 1, in which said cylinder has one or more openings, and said pumping means comprises a housing having internal cylindrical walls journalled on said drive sleeve and a radially outer portion received in said openings of said cylinder for being held against rotation, said fluid pumping means having elements operably disposed within said pump housing driven by said drive sleeve for operation.

7. A self-contained wet clutch system as in claim 6, in which said input comprises an annular surface and said output comprises a hub effective to carry certain of said friction elements, said hub being drivingly splined for rotation with said driven shaft; thrust bearing means interposed between said input surface and said output hub, and said fluid directing means being effective to direct the fluid output of said pumping means to impinge upon said hub to be urged toward said input face and thereby more positive contact with said bearing means therebetween.

8. A self-contained wet clutch system comprising: clutching means having rotative input and output means with inter-engageable friction elements therebetween, resilient means normally providing engagement of said elements, a sleeve juxtaposed to said clutching means and concentric with the axis thereof, said sleeve being in driving rotative relationship with said input and fixed against axial movement, a rotatively and axially stationary pump housing piloted on said sleeve and having pumping elements disposed therein effective to receive rotative drive from said sleeve and rotative reaction from said pump housing for operation, and a reciprocally moveable unit disposed about said pump housing and effective to move independently thereof for dis-engaging said clutching means, said reciprocal unit being interconnected with said friction elements whereby movement of said unit is in one direction is effective to overcome the effect of said resilient means for dis-engaging said clutching means, and fluid directing means normally communicating the fluid output of said pumping means with said friction elements for bathing thereof.

9. A self-contained wet clutch system as in claim 8, in which said reciprocal unit comprises a pair of relatively axially moveable elements, at least one of said elements surrounding said pump housing and the other of said elements defining a pressure chamber in cooperation with said input and interposed in said fluid directing means, said fluid directing means being responsive to reciprocal movement of the first of said elements for proportionally restricting the fluid communication to said friction elements causing pressure to rise in said pressure chamber for hydraulically actuating a hydraulic assist to disengagement of said clutch means.

10. A self-contained wet clutch system comprising: clutching means having a rotative input and a rotative output effective to define a fluid enclosure with inter-engageable friction elements disposed therein, resilient means normally urging said friction elements together to provide clutch engagement, a sleeve juxtaposed to said clutching means and concentric with the axis thereof, said sleeve being in driving rotative relationship with said input while being fixed against axial movement, a reciprocal assembly disposed about said sleeve having a first portion effective to be selectively manually moved in one axial direction along said sleeve and another portion free to move axially relatively to said first portion, means inter-connecting said friction elements with said second portion of said reciprocal unit whereby movement thereof in said one direction is effective to overcome said resilient engaging means and thereby promote clutch dis-engagement, hydraulic servo means cooperating with said second portion and said input means to define a pressure chamber, fluid pumping means interposed between said second portion of said reciprocal unit and said sleeve effective to receive rotative drive from said sleeve and rotative reaction from said reciprocal unit, fluid directing means effective to normally direct the fluid output of said pumping means to said fluid enclosure, said servo means having a lost motion connection with said first portion and a spring bias effective to normally maintain said portions together, means responsive to relative movement between said first and second portion of said reciprocal unit during the initial stages of dis-engagement to divert a portion of said pumping fluid output to said pressure chamber and thereby provide an increased hydraulic assist to manual movement of said reciprocal unit.

References Cited by the Examiner

UNITED STATES PATENTS

| | | | |
|---|---|---|---|
| 2,775,330 | 12/1956 | Schjolin et al. | 192—85 |
| 3,104,746 | 9/1963 | Gadd et al. | |
| 3,249,189 | 5/1966 | Schjolin et al. | |

DAVID J. WILLIAMOWSKY, *Primary Examiner.*

ARTHUR T. McKEON, *Examiner.*